Figure 1:
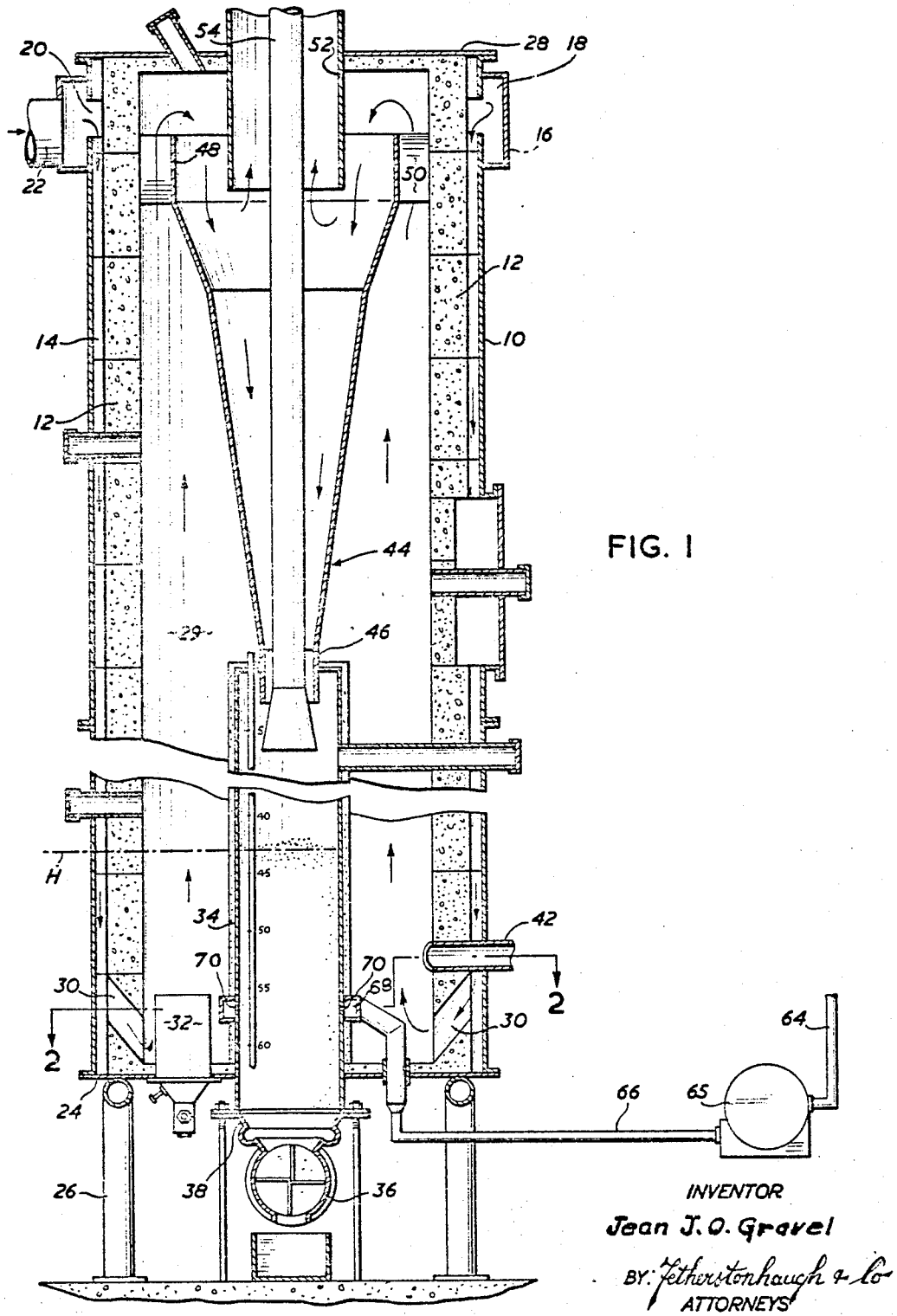

March 17, 1964     J. J. O. GRAVEL     3,125,043
METHOD OF REMOVING VOLATILE CONSTITUENTS
AND CARBON FROM RICE HULLS
Filed Oct. 28, 1960     2 Sheets-Sheet 2

INVENTOR
Jean J. O. Gravel
BY Fetherstonhaugh & Co
ATTORNEYS 3,125,043
METHOD OF REMOVING VOLATILE CONSTITUENTS AND CARBON FROM RICE HULLS
Jean J. O. Gravel, Westmount, Quebec, Canada, assignor to Mount Royal Rice Mills Ltd. and Canada Rice Mills Co., Montreal, Quebec, and Vancouver, British Columbia, Canada, jointly
Filed Oct. 28, 1960, Ser. No. 65,762
4 Claims. (Cl. 110—28)

This invention relates to a method of removing from rice hulls the volatile and carbon constituents.

By "rice hull ash" or "ash," I mean that part of the rice hull which would remain after the volatile and carbon constituents have been removed.

By "carbonaceous rice hull ash" or "carbonaceous ash," I mean rice hull ash still combined with carbon.

Rice hull ash which is mainly silica in amorphous or crystalline form has a number of uses including its use as a major constituent of refractory bricks and humidifier plates or its use as a pozzolan. In addition, new uses for rice hull ash are being suggested from time to time. In the known uses for rice hull ash, it is desirable and generally essential that no volatile or carbon constituents of rice hulls be allowed to remain combined with the ash.

A certain percentage of the volatile and carbon constituents of rice hulls may be removed by simply heating the hulls to a temperature high enough to remove the volatile constituents and allow oxidative removal of carbon. However, if carbonaceous ash or rice hulls are heated at too high a temperature, traces of low melting point or fluxing ingredients naturally embodied in such ash or hulls act as fluxes and fuse to cause formation of a glassy layer about the ash particles, occluding and preventing the oxidative removal of the remaining carbon. Moreover, when the glassy layer is formed, the particles tend to fuse together into a "clinker" form.

Moreover, for many of the uses of rice hull ash, e.g. refractory bricks or humidifier plates, it is desirable that the ash particles be separate and retain the original form of the hull instead of being in agglomerated or "clinker" form.

It is, therefore, an object of this invention to provide a method of treating rice hulls whereby the carbon and the volatile constituents thereof may be substantially completely removed.

It is an object of this invention to provide a method of treating rice hulls whereby the carbon and the volatile constituents are substantially completely removed without fusion of a material proportion of the individual particles and with minimum breakage of the particles.

It is an object of this invention to provide a method of treating rice hulls whereby the volatile constituents thereof are removed while the hull particles are suspended in a rising column of gas.

It is an object of this invention to provide a method of treating rice hulls from which the volatile constituents have been removed (i.e. "carbonaceous ash") including maintaining the carbonaceous ash lying in a bed in such a manner that the carbon is removed therefrom.

It is an object of this invention to provide a method of treating rice hulls whereby first the volatile constituents and second the carbon constituents are removed.

The method of the invention includes the steps of, removing the volatile constituents by causing the hulls to burn in surroundings maintained at a temperature of between about 500° C. and the temperature at which the fluxing ingredients of the hulls or carbonaceous ash will fuse, while suspended in a column of rising gas. (The temperature in the hull or carbonaceous ash particles themselves for fusion of the fluxing ingredients therein is about 800° C.). The temperature of the column of rising gas, or the "ambient" temperature will be about 700° C. when the temperature of the particles is about 800° C.

At temperatures of below about 500° C. in the hull the volatile constituents are imperfectly consumed and at temperatures over about 800° C. in the hull or as particles themselves, a change occurs in the fluxes rendering the carbon difficult of removal. By burning the hulls in suspension, good mixing of the hulls is obtained and the particles are easily accessible to radiant heat and also easily accessible to the oxygen-containing gas which surrounds and suspends the particle; in addition, by such suspension burning, the hulls are maintained separate and any tendency for agglomeration or the formation of clinkers is avoided. After the required period for removal of the volatile constituents (of the order of ¾ to 2 minutes), carbonaceous ash is deposited at the top of a bed.

Oxygen-containing gas is introduced into the bed at some distance below the upper surface thereof and caused to permeate upwardly therethrough. The gas removes the carbon from the ash and as the ash at the top of the bed is freed from carbon, new carbonaceous ash is deposited on the upper surface thereof and ash free of carbon is removed from the bottom of the bed, and so on.

During the curing of the carbonaceous ash in the bed, the risk again exists that the low melting point ingredients will act as fluxes to occlude the carbon in the ash. This will occur when the carbonaceous ash particle surface is greater than 800° C.

Figure 2:
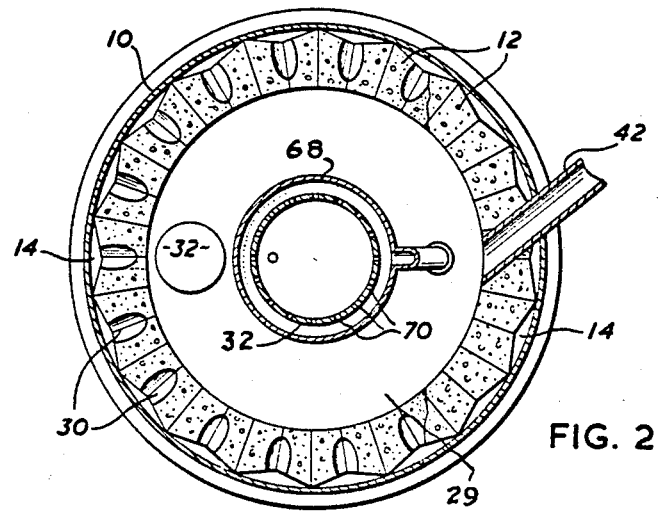
Figure 3:
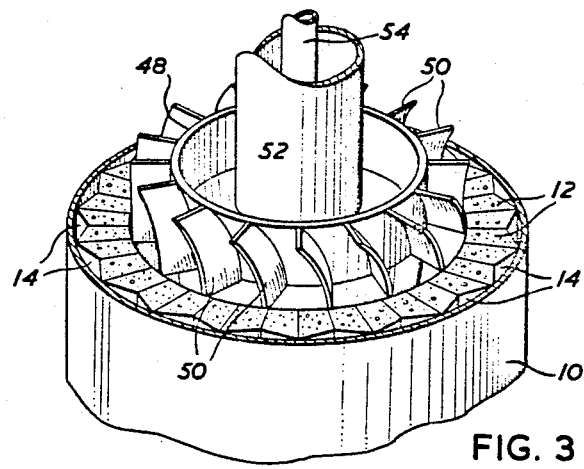

In drawings which illustrate a preferred embodiment of the invention:

FIG. 1 shows a vertical cross-section of the furnace.
FIG. 2 is a horizontal cross-section along the lines 2—2 of FIG. 1; and
FIG. 3 is a fragmentary partly sectional perspective view of the upper part of the apparatus.

In the drawings is shown a furnace comprising an outer shell 10. A brickwork formation 12 is provided insulating the shell 10 from the centre of the furnace and located adjacent the inner surface of the shell 10. The brickwork formation 12 is arranged to provide for passages between the brickwork 12 and the shell 10 for vertical passage of air therebetween substantially throughout the entire height of the shell 10, and brickwork 12 preferably provides for a series of vertical paths 14 spaced from one another about the outer circumference of the brickwork 12. A channel or "bustle" 16, U-shaped in vertical cross-section, extends about the outer wall of the shell 10 adjacent the top thereof with the free ends of the U projecting toward the shell 10 whereby an annular passage 18 is defined extending peripherally about the shell. The passage 18 is connected to each of the vertical paths 14 by ports 20 and a conduit 22 is connected to peripheral passage 14 whereby oxygen-containing gas under pressure may be supplied to the vertical paths 14. The brickwork 12 and shell 10 are terminated at their lower extremity by a base 24 which may be supported above the ground on standards 26, as shown, and which in turn supports the shell 10 and the brickwork 12. The base 24 also acts to close the lower end of the vertical paths 14.

The brickwork 12 and shell 10 are terminated at their upper extremity by an upper plate 28 as shown, having a central aperture for a stack, to be described hereafter.

Each vertical path 14 is connected to the central chamber 29 defined inside the brickwork 12 preferably by individual radial passages 30 through the bricks, the passages being located a short distance above the base 24.

Located on the base 24 radially outwardly of the centre thereof is a gas burner 32 provided with suitable fuel and air supplies, not shown. The gas burner 32 is arranged to heat the central chamber 29 in which it is placed.

Centrally located in the lower part of chamber 29 is a container 34 extending downwardly through the base 24. The bottom of container 34 is closed by means for conveniently removing measured amounts of rice hull ash therefrom, such as a four-bladed rotary valve (sometimes known as a "star" valve), schematically shown at 36. A converging, hopper-type wall 38 joins the lower (open) end of the container to the valve 36 to guide the ash to the latter.

Tangentially projecting into the chamber 29 between the container 34 and the brickwork 12 is an open-ended conduit 42 oriented and located to direct rice hulls tangentially into the chamber 29 just above the burner. The conduit 42 extends outward through the brickwork 12 and shell 10. Rice hulls are supplied to the conduit from a supply, not shown, by low pressure compressed air.

Opening downwardly into the upper end of the container 34 is a cone 44 having its narrow end 46 projecting into the container and diverging upwardly to a wide upwardly opening mouth 48 adjacent but spaced from the upper wall of the furnace. The walls of container 34, at the upper end thereof, join the outside of the cone near the narrow end. The diverging cone walls diverge toward but are spaced from the brickwork 12 at the upper end of the cone to allow a passage for the gas and rising rice hulls which are to be carried over the upper edge of the mouth 48.

The annular space between the outer surface of the upper wall of cone 44 and the inner surface of the brickwork 12 is bridged with circumferentially sloping and curved baffles or vanes 50 designed to deflect air flowing past each of them in the same circumferential direction to give the air passing them a helical upward flow pattern and which collectively resemble a turbine stator.

A stack 52 forming an outlet for the gases projects downwardly through the upper plate 28 of the furnace and centrally into the mouth 48 of the cone 44 to overlap vertically therewith to a small extent. The walls of the stack 52 are spaced from the walls defining the mouth 48 of the cone 44 to allow passage of the gases and ash downwardly through said space.

Projecting downwardly through the main stack 52 and through the cone 44 and opening into the container 34 near its upper end is an outlet pipe 54 which at an upper location (not shown) opens into the main stack 52. The clearance between the outlet pipe 54 and the narrow portion 46 of the cone 44 is just wide enough conveniently to allow the fall of carbonaceous ash between these members. Below the lower extremity of the cone 44 the pipe 54 flares outwardly to a mouth which is wide enough to overlap, in upward view, the narrow portion 46 of the cone 44. Thus, there is no direct vertical path for rising gases past the outlet pipe 54 and into the space between the outlet pipe 54 and the cone 44.

Oxygen-containing gas is supplied to the furnace through a conduit 66. The conduit 66 leads into a conduit 68 extending peripherally about the container 34. Conduit 68 is preferably located one to two feet below the intended height H for ash in container 34 and ports 70 peripherally located about container 34 connect the inside thereof with conduit 68 so that the oxygen-containing gas may be brought radially into the bed of ash from all sides under the impulsion of a pump 65. The oxygen-containing gas supplied through conduit 66 may be of any desired type to support combustion at and near the upper surface of the carbonaceous ash. Air has been found quite satisfactory for this purpose so that no special gas supply will in most cases be required. If desired, however, and/or in addition to any other gas supply, stack gases may be taken from main stack 52 and fed back through conventional coolers, temperature controls and mixers to the control 66 in combination with air.

It will be noted that the oxygen content and the temperature of the gas mixture introduced into the container, substantially affect the temperature of the carbonaceous ash.

Using air as the oxygen-containing gas, the most complete extraction of carbon from the carbonaceous ash in the bed has been achieved when the rate of flow of the air supplied has been within the ranges of 55 to 174 lbs. per hour per square foot of bed. Proper results have, in practice, been found to correspond to the existence of a carbon monoxide flame at the surface of the curing bed. The rate of flow of 55–174 lbs. per hour per square foot of bed corresponds approximately to the range of carbon monoxide flame velocities.

With air as the oxygen-containing gas, it has been found necessary that at least a pound of air be supplied per pound of rice hulls. It will thus be seen that the rate of supply of hulls is limited by the amounts, which, as carbonaceous ash, may have their carbon extracted in the bed by the gas at the available velocity within the range 55–174 lbs. per hour per square foot. It will be noted that the rate of supply of hulls may also be limited by the fact that the rate of supply to the suspension burning stage must be sufficiently low to avoid raising the temperature of the hulls and carbonaceous ash particles in the suspension stage above 800° C. Which of the upper limits for the rate of hull supply is the effective one will depend to a large extent upon the relative dimension of the bed and of the suspension burning area.

As is well known, amorphous ash may be transformed into the crystalline variety by heating the ash for appropriate periods at temperatures greater than about 1000° C. This may be performed in the same container 34 subject to the necessity of designing the equipment to withstand the higher temperatures.

Thus, using the inventive method and apparatus, either amorphous or crystalline ash may be produced.

The operation of the device is as follows:

Prior to processing the hulls, the gas burner 32 is turned on and the furnace heated until the ambient temperature in the space between the container 34 and the brickwork 12 is about 500–800° C. and preferably nearer 500° C.

The air supply is then turned on through conduit 22 travelling downwardly along the vertical paths 14 between the brickwork 12 and radially into the central chamber through passages 30 in the brickwork 12.

The air in passing down the vertical paths 14 is in heat exchange relationship to the bricks and acts to cool them and is in turn pre-heated before entering the central chamber 29.

Rice hulls are introduced tangentially into the combustion chamber from conduit 42 and air from conduit 22 through passages 30 is supplied to the chamber at a rate to suspend the rice hulls and move them upward in a time slightly longer than that found necessary to consume the volatile parts of the hulls. During this time it will be found necessary to substantially reduce the heat supplied by the burner 32 to keep the temperature in the combustion chamber 29 between about 500 and about 700° C. This is because of the heat supplied by the burning hulls themselves. The rice hulls can be made to supply all of the heat necessary at this stage. In such event, the temperature is controlled by the rate of feed of rice hulls.

The hulls with the volatile constituents removed are carried past the deflecting baffles 50 and over the upper edge of the cone 44. The helical motion supplied to the burnt hulls by baffles 50 causes them to move outwardly to the periphery of the cone 44 and to fall downwardly along the inside wall of cone 44 into the container 34. The majority of the gas entering the cone with the burnt hulls escapes up the stack 52.

Prior to introduction of the newly formed carbonaceous ash into the container 34, ash from which the volatile